United States Patent
Alnås et al.

(10) Patent No.: US 10,983,189 B2
(45) Date of Patent: Apr. 20, 2021

(54) DETERMINING A POSITION OF THE TERMINAL DEVICE IN A WIRELESS COMMUNICATION SYSTEM

(71) Applicant: Sony Mobile Communications Inc., Tokyo (JP)

(72) Inventors: Svante Alnås, Lund (SE); Johan Wadman, Lund (SE); Peter Ljung, Lund (SE); Anders Berggren, Lund (SE); Lars Nord, Lund (SE)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 16/312,678

(22) PCT Filed: Jul. 1, 2016

(86) PCT No.: PCT/EP2016/065532
§ 371 (c)(1),
(2) Date: Dec. 21, 2018

(87) PCT Pub. No.: WO2018/001518
PCT Pub. Date: Jan. 4, 2018

(65) Prior Publication Data
US 2019/0324109 A1 Oct. 24, 2019

(51) Int. Cl.
*G01S 5/00* (2006.01)
(52) U.S. Cl.
CPC .......... *G01S 5/0036* (2013.01); *G01S 5/0072* (2013.01)
(58) Field of Classification Search
CPC .... G01S 5/0036; G01S 5/0063; G01S 5/0072; G01S 5/0273
See application file for complete search history.

(56) References Cited

U.S. PATENT DOCUMENTS

2011/0183626 A1 7/2011 Das
2014/0206379 A1 7/2014 Mayor

OTHER PUBLICATIONS

International Search Report and Written Opinion from counterpart International Patent Application No. PCT/EP2016/065532 dated Mar. 9, 2017, 9 pages.

*Primary Examiner* — Dao L Phan
(74) *Attorney, Agent, or Firm* — Tucker Ellis LLP

(57) ABSTRACT

The present invention relates to a method for determining a position of a terminal device (110) in a wireless communication system (100). According to the method, a first message (130-133) is broadcasted by the terminal device (110). The first message (130-133) comprises a positioning request and a terminal identifier identifying the terminal device (110). The first message (130-133) is received at a group of neighboring devices (120-123). Each neighboring device of the group of neighboring devices (120-123) is located within a wireless radio communication range of the terminal device (110). From one or more neighboring devices (120, 121) of the group of neighboring devices (120-123) a corresponding second message (140, 141) is transmitted to location server (103) of the wireless communication system (100). The second message (140, 141) comprises the terminal identifier and an indication that the terminal device (110) requested a positioning. For each neighboring device (120, 121) of the one or more neighboring devices a corresponding position information is determined. The position of the terminal device (110) is determined at the location server (103) based on the position of the one or more neighboring devices (120, 121).

12 Claims, 2 Drawing Sheets

DETERMINING A POSITION OF THE TERMINAL DEVICE IN A WIRELESS COMMUNICATION SYSTEM

FIELD OF THE INVENTION

The present invention relates to a method for determining a position of a terminal device in a wireless communication system, in particular to a power saving method for determining the position of the terminal device. The present invention relates furthermore to a terminal device, a communication device and a location server implementing the method.

BACKGROUND OF THE INVENTION

Positioning of a device, i.e. determining a geographical position of the device, is becoming important in connection with mobile devices, for example mobile telephones, digital cameras, mobile computers, and the so-called Internet of Things (IoT). Positioning of a device may be necessary to offer tailored services for the current location, tracking services, emergency dispatching and so on. Various technologies for determining a position of a device are available for different types of devices, for example GNSS (global navigation satellite system), A-GNSS (assisted global navigation satellite system), OTDOA (observed time difference of arrival), E-CID (enhanced cell identification), UTDOA (uplink time difference of arrival), as well as other 3GPP RAT (third generation partnership program, radio access technology), independent indoor positioning methods which may be specified, for example for Wi-Fi environments based on RSSI (received signal strength indicator) and FTM (field test mode), BT (Bluetooth) based positioning, barometric pressure sensor positioning and terrestrial beacon systems (TBS).

For simple IoT devices a 3GPP standard is evolving that uses low-cost WAN (wide area network) technology, named NB-IoT (narrow band Internet of Things). The narrowband radio access technology is focusing on making the implementation simple to reduce the cost of the IoT devices, and at the same time aims on extending the battery life. From cost perspective, it may not be appropriate to implement dedicated positioning technologies like GPS (global positioning system) or other wireless local area radio technologies (Wi-Fi). Some proposals (3GPP work items RP-160199 and RP-160244) are focusing on enhancing the stand-alone positioning with the help of better positioning measurements using new types of reference signals that better fit and narrowband system for circumventing high accuracy positioning estimation problems of narrowband signals. However, these proposals require the IoT devices to perform extra power consuming tasks for measuring downlink reference signals or sending uplink signals to a base station eNB (evolved Node B), and potentially higher complexity of the device.

Therefore, there is a need for a method and devices which address the above-described problems. In particular, there is a need in the art for determining the position of a device which does not involve additional cost to the device and which requires a low amount of electrical energy.

SUMMARY OF THE INVENTION

According to the present invention, this object is achieved by a method for determining a position of a terminal device in a wireless communication system, a terminal device for a wireless communication system, a communication device for a wireless communication system, and a location server for a wireless communication system as defined in the independent claims. The dependent claims define embodiments of the invention.

According to the present invention, a method for determining a position of a terminal device in a wireless communication system is provided. According to the method, a first message is broadcasted by the terminal device. The first message comprises a positioning request and a terminal identifier which identifies the terminal device. The terminal identifier may be globally unique or temporarily unique in that context. The first message is received at a group of neighboring devices. The group of neighboring devices comprises at least one neighboring device. Each neighboring device of the group of neighboring devices is located within of wireless radio communication range of the terminal device. This means that the first message is transmitted directly as a radio signal from the terminal device to each of the neighboring devices. For example, broadcasting and receiving of the first message may comprise a direct wireless device-to-device communication between the terminal device and the corresponding neighboring device. Such a wireless direct device-to-device communication is defined in 3GPP standards and does not require additional transceiver units, and may be performed with transceiver units which are already present in the terminal device and the neighboring devices. Therefore, the wireless direct device-to-device communication does not add cost to the terminal device or the neighboring devices. Furthermore, according to the method, from one or more neighboring devices of the group of neighboring devices a corresponding second message is transmitted to a location server of the wireless communication system. The second message comprises the terminal identifier and an indication that the terminal device requested a positioning. Requesting a positioning may also include that the terminal device requests to be positioned or that the terminal device request that its position is to be determined, no matter if this positioning information is returned to the terminal device or not. Upon transmission of the second messages, for each neighboring device of the one or more neighboring devices a corresponding position information is determined. For example, upon transmission of the second messages, each neighboring device of the one or more neighboring devices includes a corresponding position information. Based on the position information of the one or more neighboring devices the position of the terminal device is determined at the location server.

To sum up, according to the above-described method, the terminal device broadcasts a positioning request (first message) to its neighboring devices. This broadcast requires only very little electrical energy. The neighboring devices, which received the broadcast, transmit the positioning measurement report (second message) on behalf of the terminal device to the location server, and the location server determines the position of the terminal device based on the positions of the neighboring devices. Therefore, no specific positioning means, for example a GPS receiver, is required in the terminal device.

According to an embodiment, for determining for each neighboring device of the one or more neighboring devices a corresponding position information, a current position of the corresponding neighboring device is determined at the corresponding neighboring device. I.e., each neighboring device determines its current position on its own, for example based on A-GNSS, OTDOA, E-CID, UTDOA, or Wi-Fi specific positioning methods. The current position of the neighboring device is comprised in the second message transmitted from the corresponding neighboring device to the location server. Additionally or as an alternative, the location server may determine the location of the one or more neighboring devices based on network positioning procedures, for example by triangulation performed by the base station or access points of the wireless communication system. However, a direct determination of the position of the terminal device within the terminal device is not required. This may contribute to reduce the power consumption of the terminal device and avoids the need for costly positioning devices to be implemented at the terminal device.

According to another embodiment, at each neighboring device of the one or more neighboring devices a radio receiving characteristic of a reception of the first message is determined. The determined radio receiving characteristic is included in the second message. The radio receiving characteristic may comprise for example a received signal strength indicator (RSSI) of the broadcasted first message. Based on the radio receiving characteristic the location server may determine the position of the terminal device more accurately. For example, based on the received signal strength, the location server may determine at least a relative distance from the terminal device to each of the neighboring devices reporting the second message. Based on the relative distance and the location of each of the neighboring devices the location server may determine the position of the terminal device, for example based on a triangulation.

According to another embodiment, the determined position of the terminal device is transmitted from the location server to the terminal device. Thus, as a response to the positioning request broadcasted via the first message from the terminal device, the terminal device may receive its location and may use this location information in corresponding applications executed at the terminal device. Additionally or as an alternative, the determined position of the terminal device may be transmitted from the location server to an emergency center, which has requested the terminal device to be positioned.

According to another embodiment, the one or more neighboring devices may comprise all neighboring devices of the group of neighboring devices which received the first message from the terminal device. In other words, all neighboring devices which received the first message broadcasted from the terminal device, transmit corresponding second messages to the location server and thus contribute to the positioning of the terminal device. However, in particular in case a large amount of neighboring devices is receiving the first message from the terminal device, a large number of second messages may be transmitted from the neighboring devices to the location server. This may be unwanted due to the resulting communication overhead. Furthermore, the large number of involved neighboring devices may not significantly contribute to further increase the positioning accuracy of the terminal device, but may unnecessarily increase the workload of the location server. Therefore, according to an embodiment, the one or more neighboring devices may comprise a subset of neighboring devices which is defined by the location server. For example, the location server may allow only some of the devices of the wireless communication system to contribute to the above-described positioning method when they receive the first message from the terminal device. Thus, the location server does not get swamped by positioning requests (second messages). Corresponding configurations from the location server may be static or dynamic. For example, the location server may provide a probability number for the devices to perform the positioning method. For example, the probability number may be 10% which means that by random only 10% of the devices which are capable of acting as neighboring devices will perform the positioning method. The probability number may be configured by the location server or another server of the wireless communication system based on a density of devices in a certain area.

According to another embodiment, the one or more neighboring devices may be defined by a mechanism provided in the neighboring devices. The mechanism is configured such that each neighboring device determines to become a member of the one or more neighboring devices based on previously transmitted second messages. For example, each neighboring device may transmit a corresponding second message only for every 10th first message received from the terminal device. Furthermore, the mechanism for selecting which neighboring device is suitable to become a member of the one or more neighboring devices for providing positioning information, may be based on a proximity of the neighboring devices to the terminal device. The proximity may be determined based on a received radio signal strength.

According to another aspect of the present invention, a terminal device for a wireless communication system is provided. The terminal device comprises a transceiver and a processing unit. The processing unit is configured to broadcast a message via the transceiver. The message comprises a positioning request and a terminal identifier identifying the terminal device. The terminal device may be configured to perform the above-described method and embodiments thereof and comprises therefore the above-described advantages.

According to an embodiment, the terminal device comprises an Internet of Things (IoT) device. For performing the above-described method, the terminal device requires no additional communication or positioning means, and only very little electrical energy is required for broadcasting the first message. Therefore, the above-described method may be used advantageously in particular in Internet of Things devices.

According to another embodiment, the terminal device may comprise a mobile telephone, a smart phone, a personal digital assistant, a wearable electronic equipment, a mobile music player, a mobile computer, or a mobile navigation system. A wearable electronic equipment, also called wearable device or smart mobile accessory, may comprise a wearable computer, also known as body born computer or simply wearable, which is a miniature electronic device that may be worn by user under, with or on top of clothing. Thus, in principle, each terminal device in the wireless communication system may advantageously use the above-described method for determining a position of the terminal device.

According to another aspect of the present invention, a communication device for a wireless communication system is provided. The communication device comprises a transceiver and a processing unit. The processing unit is configured to receive a first message via the transceiver. The first message has been broadcasted from a terminal device located within a wireless radio communication range of the communication device. In other words, the first message is received via a direct radio communication link from the terminal device. The first message comprises a positioning request and a terminal identifier identifying the terminal device. The processing unit is furthermore configured to transmit a second message via the transceiver to a location server of the wireless communication system. The second message comprises the terminal identifier and an indication that the terminal device requested a positioning. Therefore, the communication device is configured to perform the above-described method and the embodiments thereof as a neighboring device.

According to an embodiment, the communication device comprises for example a further terminal device, an access point of the wireless communication network, a relay device of the wireless communication network, or a base station of the wireless communication network. Thus, the functionality of the neighboring device may be performed to by a wide variety of devices available in a wireless communication system.

According to yet another aspect of the present invention, a location server for a wireless communication system is provided. The location server may comprise a transceiver and a processing unit. The processing unit is configured to receive from each neighboring device of a subset of neighboring devices a corresponding second message. The second messages are received via the transceiver of the location server. The second messages may be received at the location server via a direct radio communication from the neighboring devices, or the second messages may be received indirectly from the neighboring devices via a base station or an access point. For example, the base station or the access point may receive the second message directly via the radio link from the neighboring devices, and the base station or access point may forward the second messages to the location server via a wireless or wired network. The subset of neighboring devices from which the second messages are received at the location server, is a subset of neighboring devices of a group of neighboring devices. The group of neighboring devices is a group of neighboring devices which are arranged in a neighborhood of a terminal device such that the group of neighboring devices is within a direct radio communication range of the terminal device. The second messages are sent from the subset of neighboring devices to the location server after the group of neighboring devices has received a first message which is broadcasted from the terminal device. The first message comprises a positioning request and a terminal identifier identifying the terminal device. The second message comprises the terminal identifier, an indication that the terminal device requested a positioning, and a position information. The processing unit of the location server is furthermore configured to determine for each neighboring device of the subset of neighboring devices a corresponding position information. Furthermore, the processing unit of the location server is configured to determine the position of the terminal device based on the position information of the subset of terminal devices. Therefore, the location server is configured to perform the above-described method and the embodiments thereof, and comprises therefore also the above-described advantages.

According to an embodiment, the location server comprises for example a base station of the wireless communication network, an access point of the wireless communication network or a dedicated location server of the wireless communication network. The dedicated location server may be coupled to base stations or access points of the wireless communication network for receiving the second messages from the neighboring devices.

Although specific features described in the above summary and the following detailed description are described in connection with specific embodiments and aspects of the present invention, it should be noticed that the features of the exemplary embodiments and aspects described herein may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Same reference signs in the various drawings refer to similar or identical components.

Figure 1:
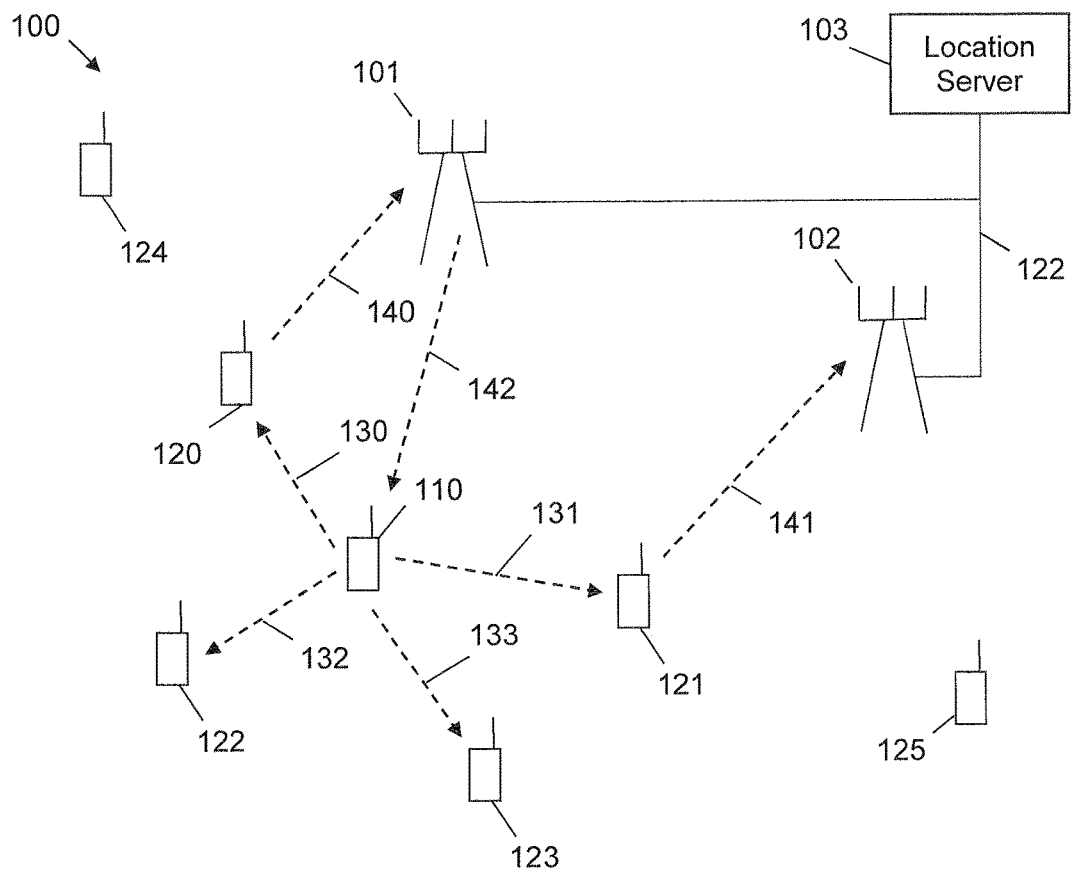
FIG. 1 shows schematically a wireless communication system according to an embodiment of the present invention.

FIG. 1 shows schematically a wireless communication system 100, for example a cellular-based wireless telecommunication network. The wireless communication system 100 may comprise a plurality of base stations 101, 102 and a location server 103. Although in FIG. 1 the location server 103 is shown as a separate device, the location server may be implemented as a location service in the base stations 101, 102. The location server 103 may be provided in the wireless communication system 100 for determining geographic position information of terminal devices which are operated in connection with the base stations 101, 102 in the wireless communication system 100. The terminal devices operated in the wireless communication system 100 may comprise mobile or stationary devices, for example mobile telephones, smart phones, wearable devices, mobile computers, tablet computers, stationary desktop computers, robots and cash registers. A plurality of exemplary terminal devices 110 and 120 to 125 are shown in FIG. 1. Each of the terminal devices 110 and 120 to 125 may be registered at and may have a communication connection to one or both of the base stations 101, 102.

For each or at least some of the terminal devices 110 and 120 to 125 a positioning may be required. Positioning of a device may comprise for example determining a geographic position of the device in terms of longitude, latitude and/or altitude.

Therefore, some of the terminal devices 110 and 120 to 125 may be equipped with corresponding positioning means, for example a GPS receiver or a barometric pressure sensor. Additionally or as an alternative, the terminal devices 110 and 120 to 125 may be equipped with positioning means supporting further positioning technologies, like for example GNSS, A-GNSS, OTDOA, E-CID, UTDOA, as well as other 3GPP RAT independent indoor positioning methods which may be specified, for example for Wi-Fi environments based on RSSI and FTM, BT (Bluetooth) based positioning, and terrestrial beacon systems (TBS). However, in particular small and/or cost efficient terminal devices may not be able to determine their position on their own, as they do not comprise corresponding positioning means and/or have only limited electrical energy for performing complex positioning measurement technologies.

Figure 3:
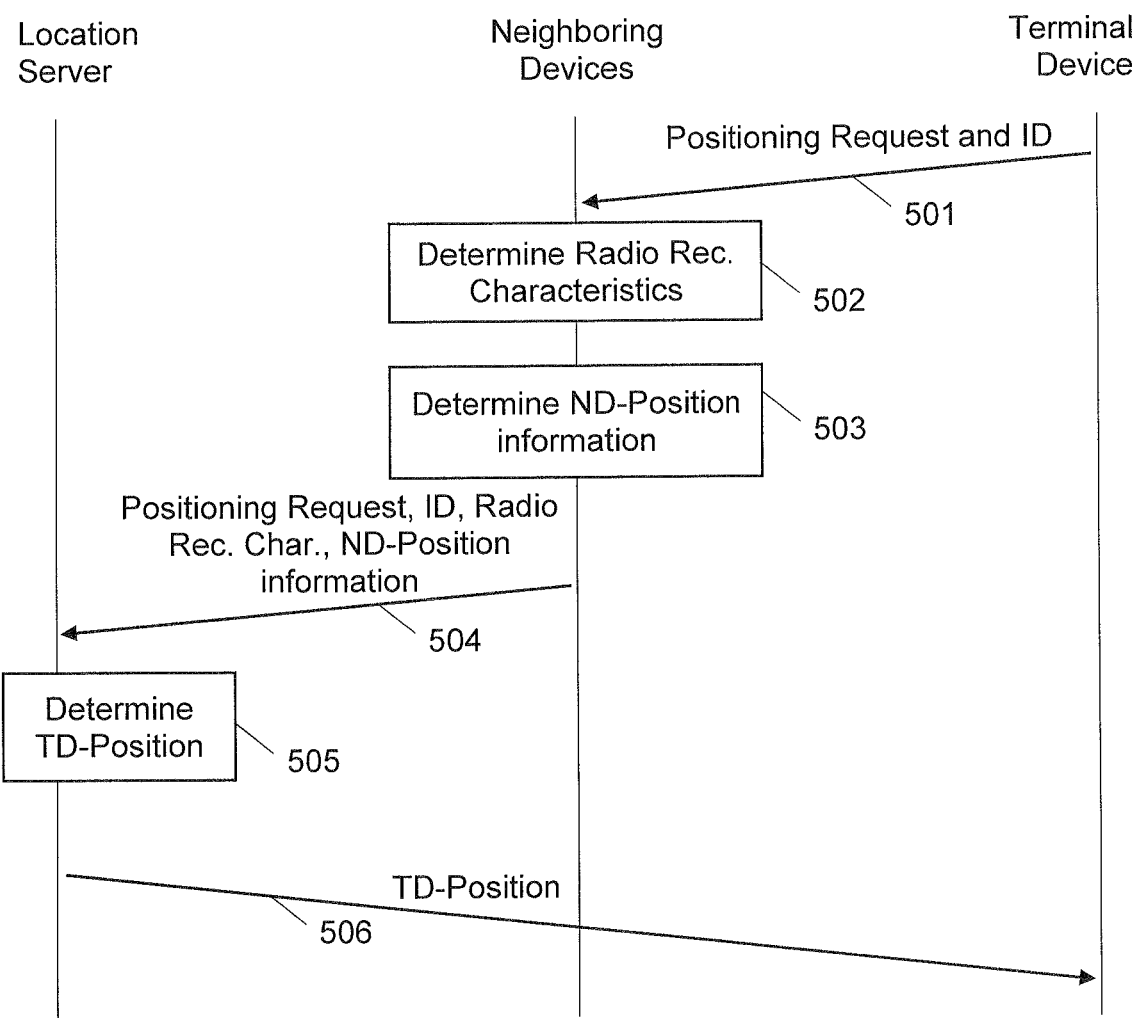
FIG. 3 shows schematically method steps of a method according to an embodiment of the present invention.

Therefore, in connection with FIG. 3, a method will be described which enables to determine the position of a terminal device in the wireless communication network 100, which does not require positioning means within the terminal device and which is very energy efficient such that it may be performed even by battery-powered terminal devices without reducing battery lifetime significantly.

Figure 2:
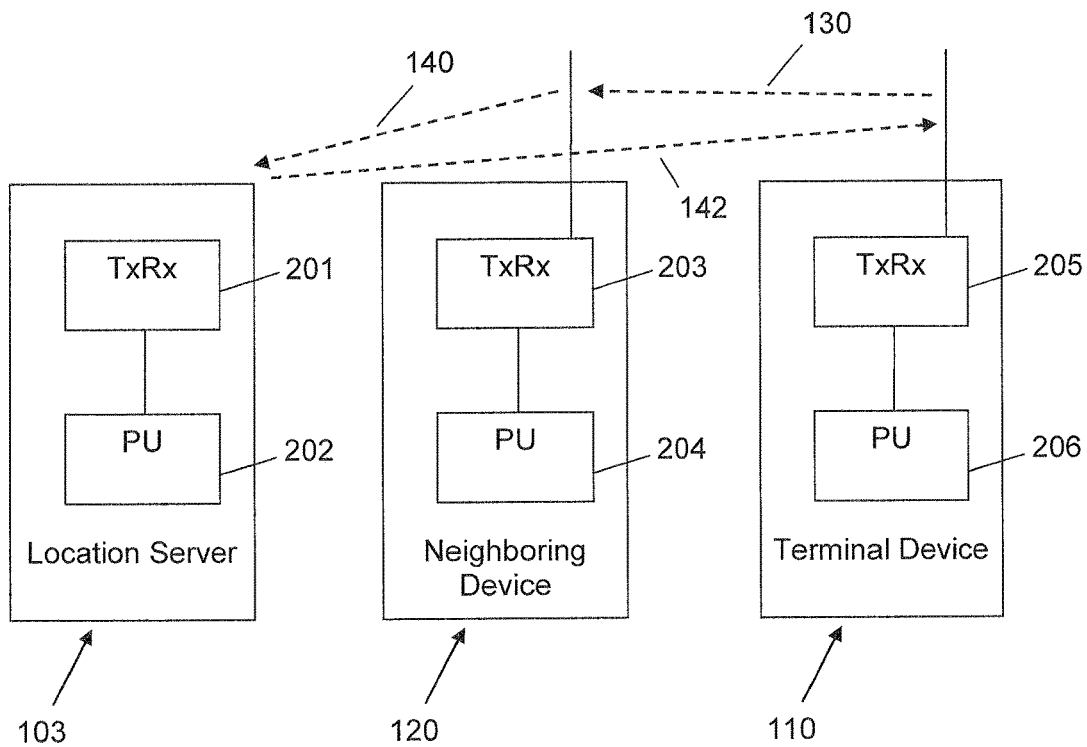
FIG. 2 shows schematically details of a location server, a neighboring device, and a terminal device according to embodiments of the present invention.

However, before describing details of the method for determining the position of the terminal device, an internal structure of the devices involved in the positioning method will be described in more detail in connection with FIG. 2.

Three types of devices are involved in the positioning method: the location server 103, a terminal device 110 whose position is to be determined, and a device 120 located near the terminal device 110, which will be called neighboring device 120.

The location server 103 comprises a transceiver (TxRx) 201 and a processing unit (PU) 202. The transceiver 201 is configured to set up communication links to the neighboring device 120 and to the terminal device 110 either via a direct wireless radio link connection or via a core network 122 and the base stations 101, 102, which provide wireless radio link connections to the neighboring device 120 and the terminal device 110.

The terminal device 110 comprises a transceiver (TxRx) 205 and a processing unit (PU) 206. Likewise, the neighboring device 120 comprises a transceiver (TxRx) 203 and a processing unit (PU) 204. For simplicity, compared to FIG. 1, the location server 103 of FIG. 2 combines at least parts of the functionalities of the base stations 101, 102 and the location server 103 of FIG. 1. However, it is a matter of course that these functionalities may be distributed among two or more devices. The terminal device 110 and the neighboring device 120 may comprise in principle the same type of device, for example a mobile telephone, a smart phone, a wearable device, a mobile computer or any other kind of mobile or stationary device which may be operated in the wireless communication system 100. However, terminal device 110 may not include a functionality to determine its position, whereas neighboring device 120 may comprise a (not shown) positioning functionality supporting a positioning technology as described above, for example GNSS, A-GNSS, OTDOA, E-CID or UTDOA. The transceivers 205, 203 are configured to set up radio link connections to the location server, for example via base stations 101, 102. Furthermore, the transceivers 203, 205 are configured to set up a direct radio communication link between two devices which are located within a direct radio communication range. In the example shown in FIG. 1, the terminal device 110 is surrounded by neighboring devices 120 to 123 which are each within a direct radio communication range of the terminal device 110. The devices 124 and 125 may be outside the direct radio communication range of the terminal device 110. The direct radio communication between two terminal devices is also known as device-two-device communication.

The method described in the following in connection with FIG. 3 may be performed by the processing units 202, 204, 206 of the location server 103, the neighboring device 120, and the terminal device 110, respectively. Although in FIG. 2 only one neighboring device 120 is shown in detail, other neighboring devices, for example the neighboring devices 121 to 123 of FIG. 1, may have the same structure and may therefore act also as neighboring devices as will be described in the following in connection with FIG. 3.

The terminal device 110 may have a need for determining its current geographic position. For example, a user of the terminal device 110 may have launched a navigation application on the terminal device 110 or an emergency call including the geographic position is to be initiated by the terminal device 110. The terminal device 110 broadcasts a message including a positioning request via the transceiver 205 (step 501). The broadcast message may be transmitted as a Narrow Band IoT (NB-IoT) signal or as a low-cost short range wireless signal, for example Bluetooth low energy (BLE). The positioning request includes a device identifier (ID) of the terminal device 110. The device identifier may be a temporary device identifier, for example a so-called temporarily mobile subscriber identifier (TMSI). The broadcasting of the positioning request may be triggered by the terminal device 110 itself or maybe triggered upon request from a location service from the location server 103. The broadcasted positioning request may be received by a group of neighboring devices within the direct radio communication range of the terminal device 110. In the example shown in FIG. 1, the group of neighboring devices may comprise for example neighboring devices 120 to 123, whereas devices 124 and 125 are out of reach of the direct radio communication range. Broadcasting of the positioning request is shown in FIG. 1 by arrows 130 to 133.

In step 502 each of the neighboring devices 120 to 123 determines a radio receiving characteristic of the received positioning request. The radio receiving characteristics may comprise for example a received signal strength indication (RSSI) of the broadcasted message from the terminal device 110. Based on the radio receiving characteristics, for example at least a relative distance between each of the neighboring devices 120 to 123 and the terminal device 110 may be determined.

In step 503 all or at least some neighboring devices 120-123 determine their own geographical neighboring device position information (ND-position information). In step 503 all or at least some neighboring devices 120-123 transmit a message to the location server 103 including the positioning request from the terminal device 110, the identifier (ID) of the terminal device 110, the determined radio receiving characteristics of the positioning request received from the terminal device 110, and the position information of the corresponding neighboring device (ND-position information). In the example shown in FIG. 1, only the neighboring devices 120 and 121 transmit corresponding messages 140 and 141 to the location server 103 via the base stations 101, 102.

As an alternative, the geographical position of the neighboring devices 120-123 may be determined by the location server 103. In this case, the step 503 only includes the positioning measurements and the final position calculation is performed in the location server 103 and the messages transmitted in step 504 do not include the position information of the neighboring devices.

In step 505 the location server 103 determines the position of the terminal device 110 (TD-position) based on the information in the messages received from the neighboring devices 120 to 123. For example, based on the radio receiving characteristics the location server 103 may determine the position of the terminal device 110 based on the positions of the neighboring devices via a triangulation. However, a rough determination of the position of the terminal device 110 may be estimated without evaluating the radio receiving characteristics by simply combining the positions of the neighboring devices which are reporting the positioning request from the terminal device 110. For example in the arrangement shown in FIG. 1, a rough position determination of the terminal device 110 may be estimated by averaging the positions of the neighboring devices 120 to 123.

In step 506 the determined positioning for the terminal device 110 may be transmitted from the location server 103 to the terminal device 110 as indicated by arrow 142 in FIG. 1.

In case a large number of neighboring devices is within a direct radio communication range of the terminal device 110, a large number of messages may be transmitted in step 504 from the neighboring devices to the location server 103. To limit the number of these messages to the location server 103, the network may provide a probability number for the neighboring devices to perform the location messaging. If this number is for example 10%, then by random only 10% of the neighboring devices will perform the location messaging. The network may set up this probability number based on the density of the devices in a certain area.

To sum up, according to the method described above, a terminal device 110 that wants to be positioned, sends a request to neighboring devices 120 to 123 to perform positioning reporting and location update to the location server 103. The neighboring devices 120 to 123 transmit to the location server 103 positioning request messages comprising an ID of the terminal device 110 and any relevant radio measurements of the received message from the terminal device 110. Optionally, the neighboring devices 120 to 123 may also send their own positions, so-called user provided location information (UPLI). Therefore, the "cost" for the terminal device 110 is only to send a broadcast message to all neighboring devices 120 to 123.

The above-described positioning method may be advantageously used in connection with an emergency scenario.

For example, the terminal device 110 needs to make an emergency call or an emergency message. The terminal device 110 connects directly to the communication network 100 or via a relay and establishes an emergency bearer. At the same time, the terminal device 110 may also broadcast a "positioning request message", or may wait for a location service to instruct the terminal device 110 to do so. The broadcast may be detected by neighboring devices 120 to 123. In case some neighboring devices belong to another public land mobile network (PLMN), the location services in the different PLMNs need to share the data or share the data via a third party application service. An emergency call session control function (E-CSCF) of the wireless communication system 100 may use the cell information obtained when setting up the emergency bearer in order to route the emergency call to an appropriate public safety answer point (PSAP). Parallel to setting up the emergency call with the PSAP, the neighboring devices that detected the broadcast message from the terminal device 110 will start sending their location measuring reports, their own positioning (UPLI) to the location server 103, and additionally information relating to the ID of the terminal device 110 and any relevant radio frequency measurements made on the broadcast signal, for example RSSI. When the PSAP requests the wireless communication system 100 for providing the accurate position of the terminal device 110, the location server 103 will use all incoming reports from the neighboring devices tagged with the ID of the terminal device 110, and will estimate the position of the terminal device 110 and report this position back to the PSAP.

The invention claimed is:

1. A method for determining a position of a terminal device in a wireless communication system, the method comprising:
   broadcasting a first message by the terminal device, the first message comprising a positioning request and a terminal identifier identifying the terminal device,
   receiving the first message at a group of neighboring devices, the group of neighboring devices comprising at least one neighboring device, each neighboring device of the group of neighboring devices being located within a wireless radio communication range of the terminal device,
   transmitting from one or more neighboring devices of the group of neighboring devices a corresponding second message to a location server of the wireless communication system, the second message comprising the terminal identifier and an indication that the terminal device requested a positioning,
   determining for each neighboring device of the one or more neighboring devices a corresponding position information, and
   determining, at the location server, the position of the terminal device based on the position information of the one or more neighboring devices.

2. The method according to claim 1, wherein determining for each neighboring device of the one or more neighboring devices a corresponding position information comprises:
   determining, at the corresponding neighboring device, a current position of the neighboring device,
   wherein the second message comprises the current position of the neighboring device.

3. The method according to claim 1, wherein the method further comprises:
   determining, at each neighboring device of the one or more neighboring devices, a radio receiving characteristic of a reception of the first message,
   wherein the second message comprises the determined radio receiving characteristic.

4. The method according to claim 1, wherein the method further comprises:
   transmitting the determined position of the terminal device from the location server to the terminal device.

5. The method according to claim 1, wherein broadcasting and receiving of the first message comprises a wireless device-to-device communication between the terminal device and the corresponding neighboring device.

6. The method according to claim 1, wherein the one or more neighboring devices comprise at least one of:
   all neighboring devices of the group of neighboring devices which received the first message from the terminal device,
   a subset of neighboring devices defined by the location server, and
   a subset of neighboring devices defined by a mechanism provided in the neighboring devices, wherein the mechanism is configured such that each neighboring device determines to become a member of the subset based on previously transmitted second messages.

7. A terminal device for a wireless communication system, the terminal device comprising:
   a transceiver, and
   a processing unit configured to broadcast a message, the message comprising a positioning request and a terminal identifier identifying the terminal device, wherein the terminal device is configured to perform the method according to claim 1.

8. The terminal device according to claim 7, wherein the terminal device comprises an Internet of Things device.

9. A communication device for a wireless communication system, the communication device comprising:

a transceiver, and a processing unit configured to receive a first message broadcasted from a terminal device located within a wireless radio communication range of the communication device, the first message comprising a positioning request and a terminal identifier identifying the terminal device, and transmit a second message to a location server of the wireless communication system, the second message comprising the terminal identifier and an indication that the terminal device requested a positioning.

10. The communication device according to claim 9, wherein the communication device comprises at least one of a group comprising a further terminal device, an access point of the wireless communication network, a relay device of the wireless communication network, and a base station of the wireless communication network.

11. A location server for a wireless communication system, the location server comprising:

a processing unit configured to receive from each neighboring device of a subset of neighboring devices of a group of neighboring devices of a terminal device of the wireless communication system a corresponding second message after the group of neighboring devices has received a first message broadcasted from the terminal device, the first message comprising a positioning request and a terminal identifier identifying the terminal device, the second message comprising the terminal identifier and an indication that the terminal device requested a positioning, wherein each neighboring device of the group of neighboring devices is located within a wireless radio communication range of the terminal device, determine for each neighboring device of the subset of neighboring devices a corresponding position information, and determine the position of the terminal device based on the position information of the subset of neighboring devices.

12. The location server according to claim 11, wherein the location server comprises at least one of a group comprising a base station of the wireless communication network, an access point of the wireless communication network, and a dedicated location server of the wireless communication network.

* * * * *